United States Patent [19]

Drees

[11] 4,368,392
[45] Jan. 11, 1983

[54] WATER TURBINE

[75] Inventor: Herman M. Drees, Cotuit, Mass.

[73] Assignee: Pinson Energy Corporation, Marstons Mills, Mass.

[21] Appl. No.: 269,701

[22] Filed: Jun. 3, 1981

[51] Int. Cl.³ .............................. F03B 3/14; F03D 7/06
[52] U.S. Cl. ........................................ 290/54; 290/43; 416/119
[58] Field of Search .................... 290/43, 44, 54, 55; 416/17, 24, 41, 106, 111, 119, 202

[56] References Cited

U.S. PATENT DOCUMENTS

| 1,823,169 | 8/1928 | Schneider et al. | 416/111 |
|---|---|---|---|
| 1,835,018 | 12/1931 | Darrieus | 416/212 R |
| 2,622,687 | 12/1952 | Cohen | 170/99 |
| 3,690,787 | 9/1972 | Gross | 416/61 |
| 3,700,349 | 10/1972 | Fork | 416/111 |
| 3,704,961 | 12/1972 | Fork et al. | 416/111 |
| 3,922,012 | 11/1975 | Herz | 290/43 |
| 3,976,396 | 8/1976 | Antogini | 416/119 |
| 3,978,345 | 8/1976 | Bailey | 290/54 |
| 4,050,246 | 9/1977 | Bourquardez | 290/55 X |
| 4,052,134 | 10/1977 | Rumsey | 416/119 |
| 4,095,422 | 6/1978 | Kurakake | 60/398 |
| 4,104,536 | 8/1978 | Gutsfeld | 290/54 |
| 4,105,363 | 8/1978 | Loth | 416/41 |
| 4,115,027 | 9/1978 | Thomas | 290/55 X |
| 4,180,367 | 12/1979 | Drees | 416/119 |
| 4,247,251 | 1/1981 | Wuenscher | 416/24 |

FOREIGN PATENT DOCUMENTS

| 860930 | 12/1952 | Fed. Rep. of Germany | 416/108 |
|---|---|---|---|
| 530231 | 12/1921 | France | 416/135 |
| 296736 | 2/1928 | United Kingdom | 416/108 |

Primary Examiner—J. V. Truhe
Assistant Examiner—W. E. Duncanson, Jr.
Attorney, Agent, or Firm—G. Roger Lee

[57] ABSTRACT

A water turbine for open stream use featuring a vertical-axis cross-flow turbine in which cyclically-pitching blades are supported from one end only to permit the supporting structure and power generation gear to be supported out of the water. In preferred embodiments, there is independent pitch control of the turbine blades to make the blades responsive to the instantaneous flow in their vicinities.

18 Claims, 9 Drawing Figures

U.S. Patent   Jan. 11, 1983   Sheet 1 of 3   4,368,392
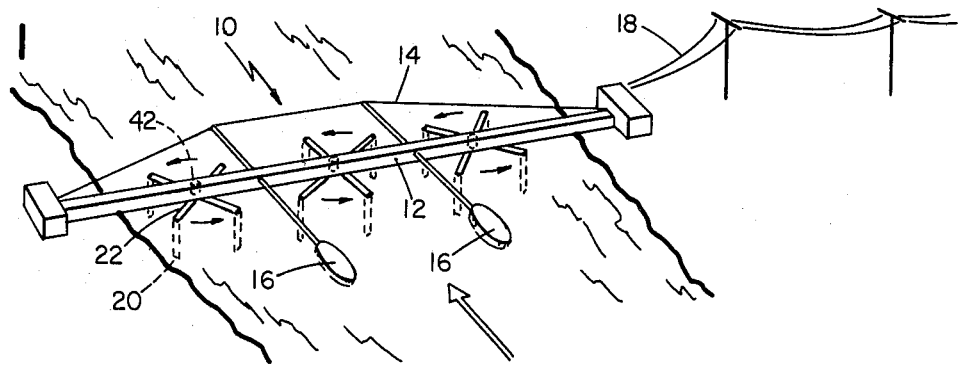
FIG 1
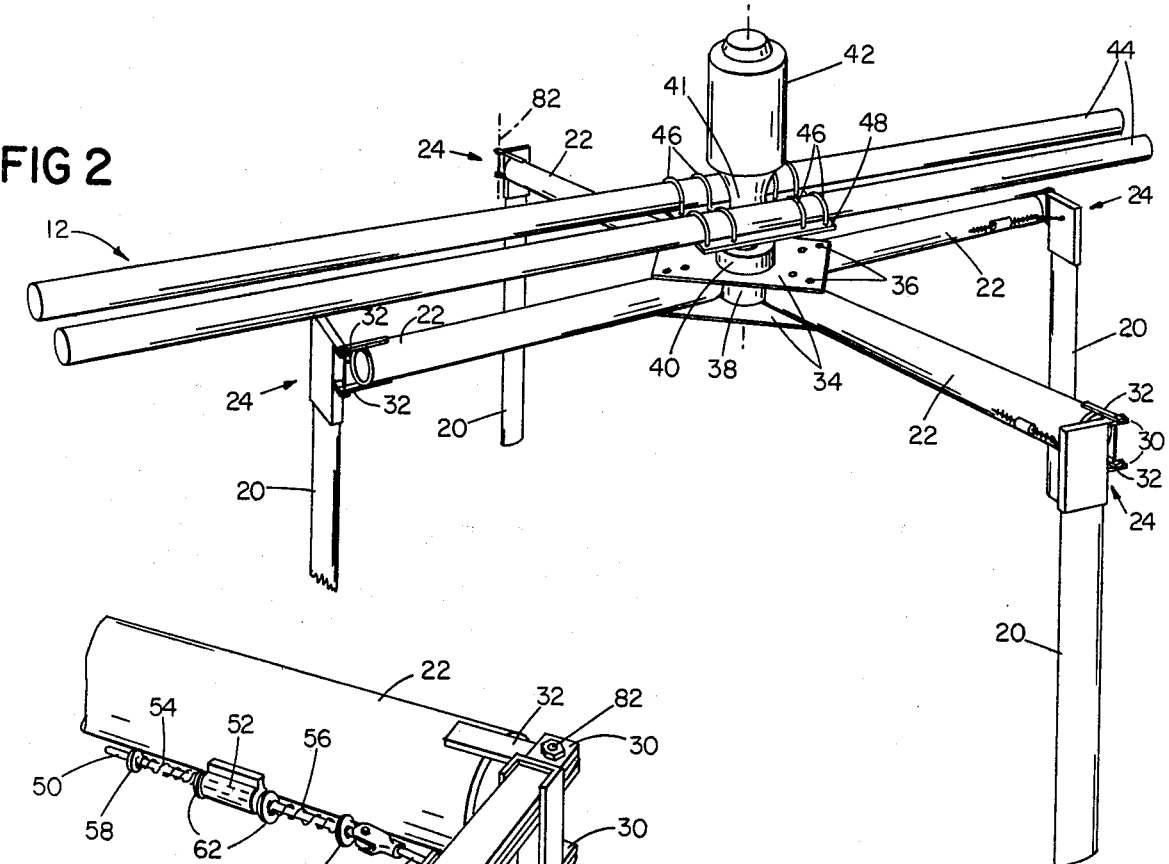
FIG 2
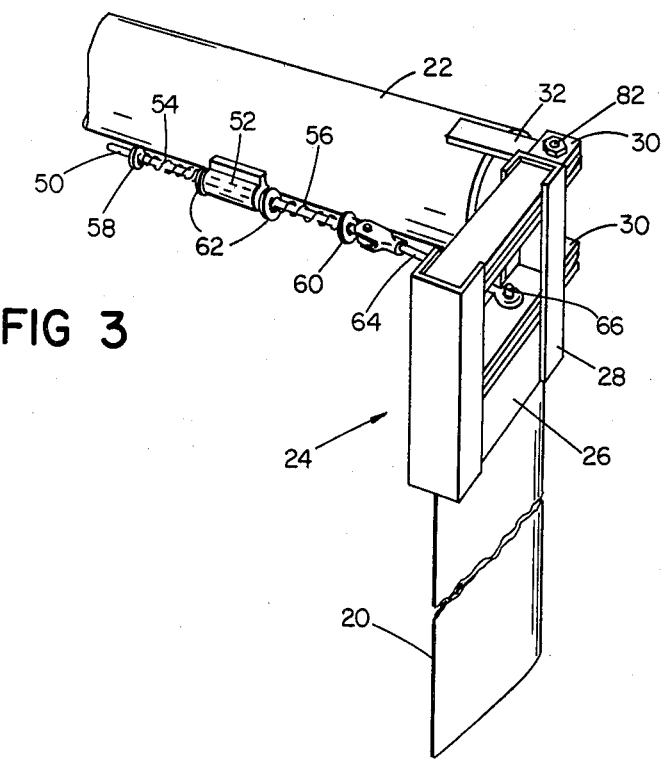
FIG 3
FIG 4

WATER TURBINE

FIELD OF THE INVENTION

This invention relates to water turbines for generation of electrical power from a flowing body of water.

BACKGROUND OF THE INVENTION

There are numerous sites on rivers, in estuaries, and in regions of strong off-shore currents, where substantial energy could be extracted from the flowing water, but where a dam is impractical to build. What is needed is a practical water turbine that can operate in an open stream, i.e., at very low pressure head. Conventional water turbines generally require a much higher pressure head than is available in open streams, and thus require dams.

There have been prior efforts at open stream turbines. Most familiar, of course, is the paddle-wheel type in which the drag force on the paddles turns the turbine. Numerous designs have been proposed: some fully submerged, others not; some with vertical axes of rotation, others with horizontal axes. Some such designs are centuries old, but there has continued to the present day a strong interest in paddle-type water turbines, e.g., Gutsfeld (U.S. Pat. No. 4,104,536), Kurakake (U.S. Pat. No. 4,095,422), Antogini (U.S. Pat. No. 3,976,396), and Herz (U.S. Pat. No. 3,922,012). All such designs, however, have very low efficiency (i.e., very little of the available power in the stream is actually extracted) owing to their dependence on drag.

There have been some efforts at using lifting surfaces in open stream water turbines. Darrieus U.S. Pat. No. 1,835,018 suggests a turbine that has a plurality of vertical, airfoil-like blades supported at the top and bottom for rotation around a central vertical axis. Bailey U.S. Pat. No. 3,978,345 shows several water turbines strung across a stream; the axis of rotation is horizontal and the blades, support structure and power take-off equipment are for the most part below water. Both the Darrieus and Bailey turbines have axes of rotation that are transverse to the flow direction, and thus are known as cross-flow turbines.

To maximize the efficiency of a cross flow turbine it is known that blade pitch should vary cyclically, to maintain an angle of attack that maximizes lift over drag. Darrieus shows a common eccentric ring and associated links to cyclically pitch the blades. The Bailey open stream turbine uses a central hydraulic control and hydraulic lines running therefrom to the blades to cyclically change the attitude of control vanes on the trailing edges of the blades. Both arrangements thus depend on a central control unit to prescribe pitch for all blades.

SUMMARY OF THE INVENTION

I have discovered a practical and very efficient water turbine design for open stream use. In a first aspect, my invention features a vertical-axis cross-flow turbine in which cyclically-pitching blades are supported from one end only to permit the supporting structure and power generation gear to be supported out of the water. In preferred embodiments, a plurality of radial arms (e.g., aluminum tubes) extend from a central hub to pivotally support (e.g., via an aluminum bracket welded to the blade end) the blades (e.g., aluminum extrusions), a speed increaser (e.g., with cams, rollers, and cycloid discs—rather than gears—for increased efficiency) driven from the hub provides a high speed input for the generator, and both the speed increaser and the generator are coaxial with the turbine's vertical rotation axis. The new water turbine is mechanically simple, easy to maintain, and it locates the blades in the generally faster flowing surface region of a stream.

In a second aspect, my invention features independent pitch control of the turbine blades to make the blades responsive to the instantaneous flow in their vicinities. This simplifies mechanical design, makes the turbine start faster, and increases efficiency. In some preferred embodiments, the blades are pivoted ahead of their hydrodynamic centers so that the hydrodynamic loading causes them to cyclically pitch, and means are provided to resist this natural pitching, separately for each pitching direction (such as a spring and linkage connection between the blade and the support structure, e.g., with a pair of coil compression springs, each resisting one pitching direction), to permit independent adjustment of upstream and downstream pitch angle. In other preferred embodiments, the blades are pivoted near their hydrodynamic centers, a separate pitch control blade is mounted on an independently-pivoting frame, and pitch of the frame controls pitch of the main blade (e.g., via stops that push against the bracket supporting the blade thereby causing it to pitch).

PREFERRED EMBODIMENT

A preferred embodiment of the invention will now be described, after first briefly describing the drawings.

DRAWINGS

FIG. 1 is a perspective view of said embodiment installed in a flowing body of water.

FIG. 2 is a perspective view of one water turbine of said embodiment.

FIG. 3 is an enlarged perspective view showing the manner in which the blades are attached.

FIG. 4 is a cross sectional view of a blade.

STRUCTURE

Figure 5:
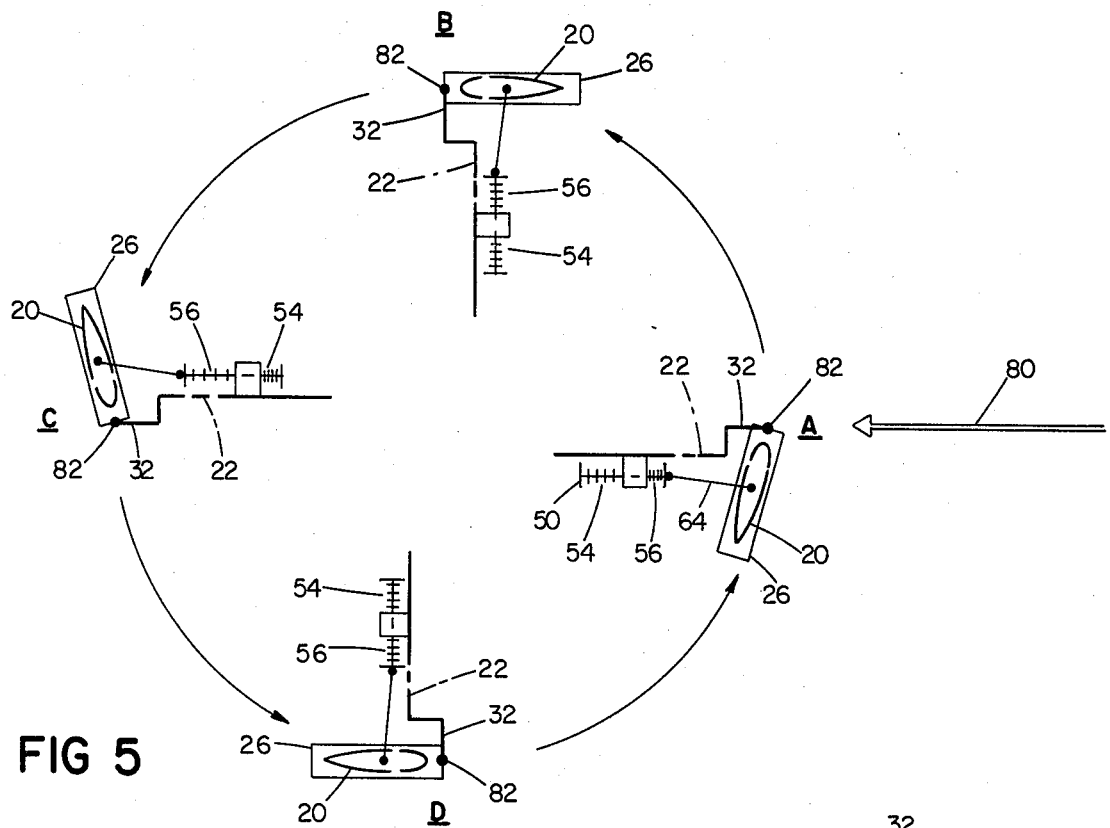
FIG. 5 is a diagrammatic view showing the change in angular position of the blades as the water turbine revolves.
Figure 6:
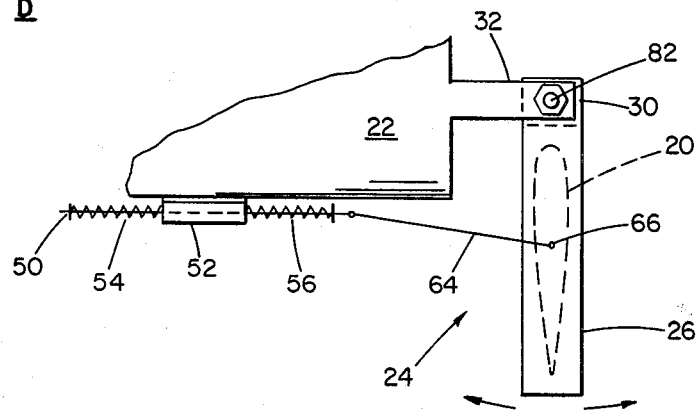
FIG. 6 is a plan view showing the blade pitch control mechanism for one blade.

There is shown diagrammatically in FIG. 1 an installation of three water turbines 10 spanning the breadth of a flowing body of water. Structural beam 12, shown diagrammatically, supports the three turbines 10. Stiffener 14 and antitorsion floats 16 are provided to counteract the drag force and torsion applied by the flowing water. Power generated is fed into electrical utility lines 18 (either directly or through power conversion equipment).

A single water turbine is shown in FIG. 2. Blades 20 (NACA0015 symmetrical airfoil cross section; aluminum extrusion 347-832 available from Alcoa Aluminum Company; 4 feet long; 6 inch chord; cross section shown in FIG. 4) are pivotally attached to arms 22 via blade attachment bracket 24 (FIG. 3). The upper end of blade 20 is received in rectangular aluminum casting 26 and welded thereto. The casting and blade assembly is welded to blade support weldment 28, which includes a pair of clevises 30 which serve to pivotally attach the blade and bracket to arm 22 via bearings (stainless steel NMB ART6 self-lubricating, Teflon fabric liner, spherical ball bearing) in tabs 32 welded to the end of the arm. The blade's pivot axis is at roughly its leading edge.

Arms 22 (6.5 inch O.D., ¼ inch wall, cylindrical aluminum tubes) are connected to a center hub, consisting of steel plates 34, which sandwich the arms 22, and a large reinforced gear-belt pulley 38. The overall diameter, blade to blade, of the turbine is 10 feet.

The blade-arm-hub assembly is connected to the input shaft of speed increaser 40 (via the taper-locking bushing of pulley 38). The speed increaser (Sumitomo SM Cyclo Speed Increaser Type VFJ) has a gearless drive train with cams and rollers housed in two cycloid discs; it provides a large speed change (59:1) with high efficiency (approaching 95%). The output of the speed increaser is connected via a coupling 41 (available from Sumitomo) to a DC generator 42 (Baldor 215C; 14.5 amperes, 180 VDC, 3 hp at 1750 rpm).

The entire water turbine is supported by a pair of aluminum tubes 44 connected to the turbine by U-bolts 46 and plate 48, which is secured to speed increaser 40.

The pitch of each blade 20 is controlled independently of the other blades by a linkage and spring mechanism mounted between its respective support bracket 24 and arm 22. Rod 50 slides within supporting tube 52, which is welded to arm 22. Two compression coil springs 54, 56 are mounted on rod 50 on either side of tube 52 and inside of stops 58, 60 fixed to the rod 50. Freely moving washers 62 are positioned between the springs and tube 52. Connecting rod 64 is pivotally connected between one end of rod 50 and pin 66 on blade support bracket 24.

Figures 7, 8, 9:
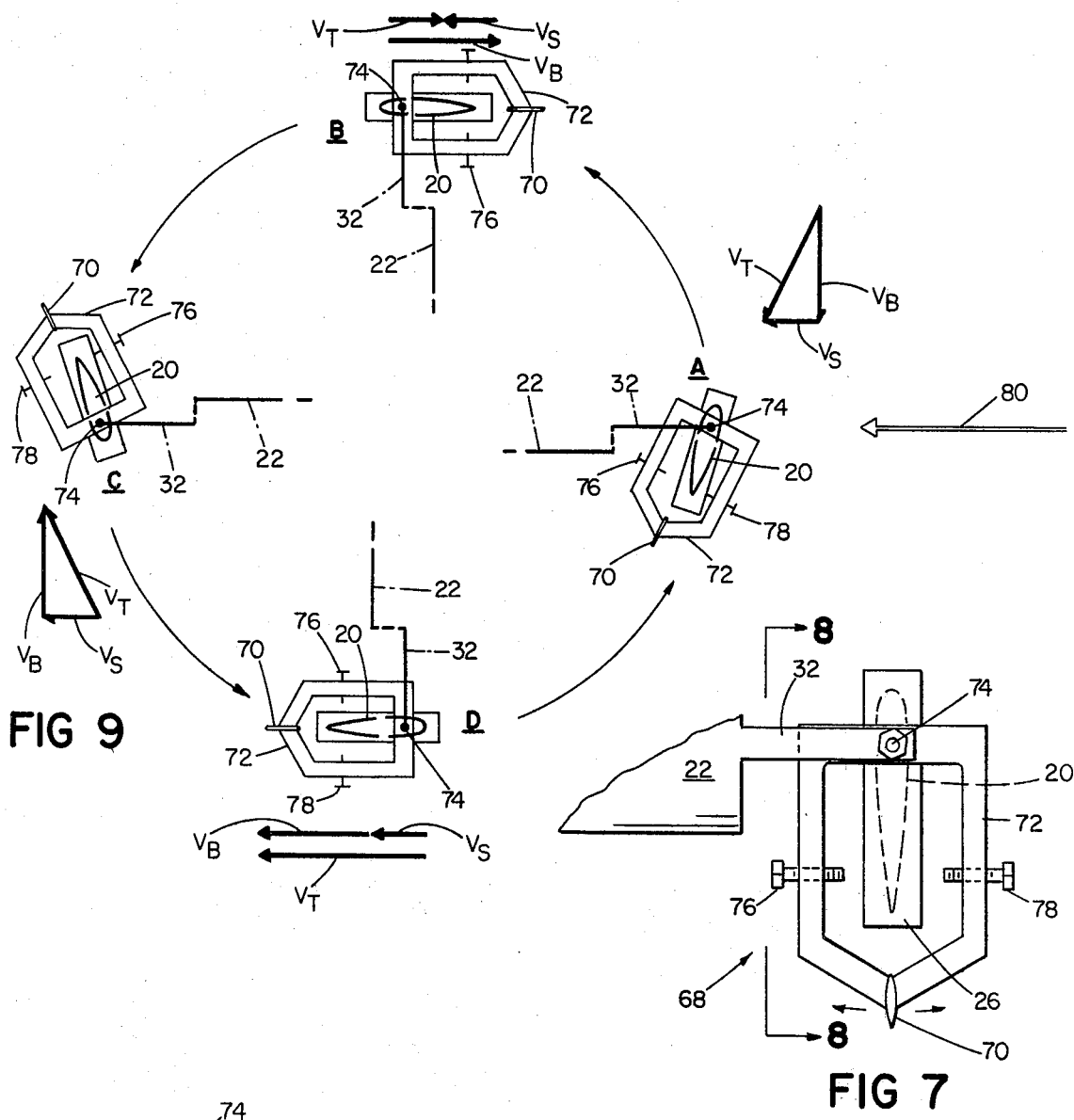
FIG. 7 is a plan view showing the blade pitch control mechanism of an alternative embodiment.
FIG. 8 is an elevation view of the blade pitch control mechanism of said alternative embodiment.
FIG. 9 is a diagrammatic view showing the angular orientation of the blade pitch control mechanism of said alternative embodiment.

Turning to FIGS. 7 and 8, there is shown an alternative blade pitch control mechanism, in which blades 20 are pivoted from arm tabs 32 at pivot axis 74, which is slightly behind the hydrodynamic center at the quarter-chord line. Further, the rod spring mechanism of FIG. 3 is replaced by a trailing pitch-control blade 70 (immersed area less than 10% and preferably about 5% of the immersed area of blade 20) supported on frame 72 which pivots independently of the blade about pivot line 74. Adjustable stops are provided on either side of blade 20 by screws 76, 78. The screws bear upon a portion of blade-support weldment 28.

Operation

In operation the water turbines 10 are installed in a flowing body of water at an elevation such that blades 20 (and control blades 70 in the alternative embodiment) are nearly fully immersed but the remainder of the turbine is above water level. Turbine rotational speed is selected to maximize the amount of power generated. Known mathematical analyses of cross-flow turbines have shown, for the size turbine described here and for 10° half-amplitude cyclic pitch, that maximum power can be extracted from the flowing stream if the blade speed is roughly twice the stream flow speed. For a typical stream flow speed of about 4–5 mph, the desirable turbine rotational speed is roughly 30 rpm. To provide generator 42 with its 1750 rpm operating speed, a speed increase ratio in the range of 59:1 was chosen for speed increaser 40.

Turbine rotation begins unassisted once the blades are immersed in the flowing stream. During startup, the hydrodynamic center is further aft than the quarter chord, thus providing a greater moment arm for the drag force to pitch the blades. The result is that the blades have substantial pitch while moving with the stream (in the vicinity of position B) but little or no pitch while moving against the stream (in the vicinity of position D), resulting in a net counterclockwise starting torque.

Once rotation is underway, lift forces predominate over drag, and the drag-induced starting torque is replaced by lift-induced torque. To maximize the power-extraction efficiency of the turbine, it is known to strive to match as closely as possible the known ideal relationship of cyclical pitch angle versus azimuth angle (the angle of turbine rotation). If followed exactly, the blades are maintained at an angle of attack at which the lift to drag ratio is maximized, except in the neighborhood of positions B and D (FIG. 5), where the blade pitch angle passes through zero degrees while rapidly changing polarity. It is also necessary for the polarity of the angle of attack (with respect to the net velocity vector) to change each time a blade passes positions B and D.

It turns out that the simple spring and linkage arrangement of FIG. 3 comes reasonably close to producing the ideal cyclical pitch. Furthermore, it is sensitive to instantaneous local variations in water flow speed and direction at a particular blade location, whereas the ideal cyclical pitch curves generally assume a uniform stream direction and speed at all blade locations.

Operation of the spring and linkage arrangement is quite simple. Placement of the blade pivot axis ahead of the hydrodynamic center tends to cause the blades to assume a natural cyclical pitch—leading edge outward in the upstream half of a rotation and leading edge inward in the downstream half, with the pitch angle moving rapidly from one polarity to the other at positions B and D (FIG. 5). As blades 20 pitch, connecting rod 64 moves sliding rod 50, which, in turn, via stops 58, 60 and tube 52 compresses one or the other of springs 54, 56, thereby resisting the pitching tendency of the blades. The characteristics of springs 54, 56 determine the amplitude of the pitch during the downstream and upstream travel of the blades, respectively. Spring 56 is selected to give an upstream pitch angle of about 10°, which achieves an angle of attack of somewhat less than 10°. To achieve the same angle of attack during downstream travel, spring 54 is selected to give a downstream pitch angle slightly greater than 10°, so as to compensate for the slight reduction in stream velocity in the downstream region.

The alternative pitch control mechanism shown in FIGS. 7-9 also provides independent pitch control of each individual blade, but the main blades 22 are not themselves the source of the pitching torque, as they are pivoted slightly behind the hydrodynamic center. Instead trailing control blade 70 attached to pivoting frame 72 supplies the pitching torque, via one or the other of screws 76, 78.

Like a weathervane, control blade 70 tends to stay aligned with the net flow velocity (vector $V_T$, the vector sum of the peripheral blade velocity $V_B$ and stream velocity $V_S$). Thus, in upstream position A the control blade 70 and frame 72 pitch in a clockwise direction to head into the net velocity vector $V_T$; in turn, this action tends, via stop screw 78 pushing against weldment 28, to pitch the main blade 20 in the same clockwise direction. The main blade, on the other hand, has a slight tendency to pitch in the opposite direction (counterclockwise in position A), and thus opposes the clockwise movement caused by the control blade. The much greater pitching torque produced by the control blade is, however, controlling, and the opposing torque on the main blade serves only to keep weldment 28 in firm contact against stop screw 78. The small separation between the pivot axis 74 and the blade hydrodynamic center is selected to provide enough opposing torque to maintain this firm contact. Stop screw 78 is adjusted to achieve the angle of attack that gives maximum lift over drag.

As the blade continues to revolve, control blade 70 continually aligns itself with the net flow velocity $V_T$, and thereby maintains blade 20 at the desired angle of attack. During the downstream travel of the blade, e.g., position C, the control blade has a pitch opposite in polarity to that during upstream travel, and stop screw 76 bears against weldment 28. At the transition positions B, D between upstream and downstream travel, where the blade is moving parallel to the stream velocity, the control blade rapidly changes pitch angle polarity, momentarily passing through the zero pitch position shown in FIG. 7.

An important aspect of the alternative embodiment is that the control blade is independently pivoted with respect to the main blade. This permits the necessary change in polarity of angle of attack when the blades pass from upstream to downstream positions.

OTHER EMBODIMENTS

Other embodiments of the invention are within the following claims. For example, instead of relying on a slight forward placement of the hydrodynamic center to cause the main blades to resist the control blades (to achieve firm contact between screws 76, 78 and weldment 28), a spring could be used to urge each main blade toward a zero pitch angle. Also, the chord and thickness of the main blades could be span-wise tapered (e.g., elliptically) to reduce induced drag.

What is claimed is:

1. A water turbine for generation of electrical power from a flowing body of water, comprising
   a plurality of vertically-extending blades, each with a hydrofoil horizontal cross section,
   a blade support structure supporting the upper ends only of said blades,
      said blade support structure including a central hub and radially extending elements extending from said hub for supporting said blades located radially of said hub,
   an electrical-power generator connected to said central hub,
   pitch control means for cyclically pitching said blades to maintain said blades at useful angles of attack for generation of electrical power, said pitch control means including means for independently controlling the pitch of individual blades in response to the instantaneous local flow conditions in the vicinity of the individual blade, and
   means for supporting said generator and blade support structure above the surface of said flowing body of water so that essentially only said blades penetrate said body of water.

2. The water turbine of claim 1 wherein said pitch control means includes means for providing the blades with a zero pitch angle twice during each revolution of said turbine at times when said blades move in a direction parallel to the direction of flow of said body of water and for providing the blades with pitch angles of opposite polarity during the portions of their movement upstream of and downstream of the center of rotation of said turbine.

3. A water turbine for generation of electrical power from a flowing body of water, comprising
   a plurality of vertically-extending blades, each with a hydrofoil horizontal cross section,
   a blade support structure supporting said blades,
   an electrical-power generator connected to said blade support structure,
   pitch control means for cyclically pitching said blades to maintain said blades at useful angles of attack for generation of electrical power, said means including
      means at each individual blade for independently controlling the pitch of said blade solely in response to the instantaneous local flow conditions in the vicinity of said blade to provide said blade with a zero pitch angle twice during each revolution of said turbine at times when said blade moves in a direction parallel to the direction of flow of said body of water and to provide said blade with pitch angles of opposite polarity during the portions of its movement upstream of and downstream of the center of rotation of said turbine.

4. The water turbine of claim 3 further comprising a speed increaser connected between said blade support structure and said generator for increasing the rotational speed of the input to said generator.

5. The water turbine of claim 4 wherein said speed increaser has a gearless drive train.

6. The water turbine of claim 3 wherein said blade support structure comprises a plurality of radial arms extending from a central hub which is connected to said electrical-power generator, said blades being pivoted from the outboard ends of said arms.

7. The water turbine of claim 6 wherein said radial arms are tubular.

8. A water turbine for generation of electrical power from a flowing body of water, comprising
   a plurality of vertically-extending blades, each with a hydrofoil horizontal cross section,
   a blade support structure supporting said blades,
   an electrical-power generator connected to said blade support structure,
   pitch control means for cyclically pitching said blades to maintain said blades at useful angles of attack for generation of electrical power, said means including
   means for independently controlling the pitch of individual blades in response to the instantaneous local flow conditions in the vicinity of the individual blade and for providing the blades with a zero pitch angle twice during each revolution of said turbine at times when said blades move in a direction parallel to the direction of flow of said body of water and for providing the blades with pitch angles of opposite polarity during the portions of their movement upstream of and downstream of the center of rotation of said turbine,
   means for pivoting said blades ahead of their hydrodynamic centers of pressure so that hydrodynamic forces on said blades tend to pitch said blades, and means for resisting the pitch induced by hydrodynamic forces so that an equilibrium pitch angle is reached for a given hydrodynamic force on a blade, said equilibrium pitch angle being such as to achieve said useful angle of attack, said means including a pair of springs and a linkage means connected between said springs and said blade for working against one said spring in response to pitch of one direction and working against the other said spring in response to pitch of the other direction, whereby the upstream angle of attack can be adjusted independently of the downstream angle of attack to compensate for stream velocity differences between upstream and downstream.

9. The water turbine of claim 8 wherein said springs are compression coil springs and said linkage means includes a central tube element, a sliding rod passing through said tube and through said springs which are located on either side of said central tube element, stops on each end of said rod, thereby capturing each said spring between one said stop and one end of said central tube element, and a link connecting said rod to said blade at a location spaced from the pivot axis thereof.

10. The water turbine of claim 9 wherein said blades are pivotally supported on the radial ends of portions of said blade support structure, and said springs, rod, and stops are all affixed to said portions of said structure in the vicinity of the pivotal attachment of said blades.

11. The water turbine of claim 8 or 10 further comprising means for supporting said generator, blade support structure, and means for cyclically pitching said blades all above the surface of said body of water, so that essentially only said blades penetrate said water.

12. A water turbine for generation of electrical power from a flowing body of water, comprising
a plurality of vertically-extending blades, each with a hydrofoil horizontal cross section,
a blade support structure supporting said blades,
an electrical-power generator connected to said blade support structure,
pitch control means for cyclically pitching said blades to maintain said blades at useful angles of attack for generation of electrical power, said means including
means for independently controlling the pitch of individual blades in response to the instantaneous local flow conditions in the vicinity of the individual blade and for providing the blades with a zero pitch angle twice during each revolution of said turbine at times when said blades move in a direction parallel to the direction of flow of said body of water and for providing the blades with pitch angles of opposite polarity during the portions of their movement upstream of and downstream of the center of rotation of said turbine,
means for pivoting said blades at or near to their hydrodynamic centers of pressure,
a pitch control blade extending vertically into said body of water in the vicinity of an individual said blade,
frame means for supporting said control blade,
means for pivoting said frame means and control blade independently of said associated blade about a vertical axis spaced from said control blade, and
stop means attached to and pivoting with said frame means for prescribing the pitch of said individual blades.

13. The water turbine of claim 12 wherein said stop means includes stop elements for contacting said individual blade or supporting structure therefor to prescribe the pitch of said blade.

14. The water turbine of claim 13 wherein said individual blade is pivoted aft of its center of pressure to thereby cause said individual blade to tend to rotate in a direction opposite that of said frame means and control blade so as to assure firm contact between said stop elements and said individual blade or supporting structure.

15. The water turbine of claim 12 wherein said control blade is mounted aft of said individual blade.

16. The water turbine of claim 15 wherein said control blade and frame means are pivoted about the same vertical axis as said individual blade.

17. The water turbine of claim 12 wherein said control blade has an immersed area of less than 10% the immersed area of said individual blade.

18. The water turbine of claim 12 wherein said control blade is supported at only its upper end by said frame means and said frame means is adapted and located to be above the water surface.

* * * * *